United States Patent
DeLaca et al.

(10) Patent No.: US 9,625,235 B2
(45) Date of Patent: Apr. 18, 2017

(54) RELAY ASSEMBLY FOR OPTICAL SIGHT

(71) Applicant: TRIJICON, INC., Wixcom, MI (US)

(72) Inventors: Rodney DeLaca, Canton, MI (US); Michael Presley, Plymouth, MI (US); Thomas K. Maciak, Brighton, MI (US)

(73) Assignee: Trijicon, Inc., Wixom, MI (US)

( * ) Notice: Subject to any disclaimer, the term of this patent is extended or adjusted under 35 U.S.C. 154(b) by 455 days.

(21) Appl. No.: 14/228,792

(22) Filed: Mar. 28, 2014

(65) Prior Publication Data

US 2015/0276348 A1 Oct. 1, 2015

(51) Int. Cl.
*F41G 1/38* (2006.01)
*G02B 13/00* (2006.01)
*G02B 23/16* (2006.01)

(52) U.S. Cl.
CPC ........... *F41G 1/38* (2013.01); *G02B 13/0095* (2013.01); *G02B 23/16* (2013.01)

(58) Field of Classification Search
CPC .. G02B 13/0095; G02B 13/002; G02B 23/16; F41G 1/38; F41G 1/30; F41G 1/16; F41G 1/00; F41G 3/08; F41G 3/00; F41G 5/00
See application file for complete search history.

(56) References Cited

U.S. PATENT DOCUMENTS

| | | | |
|---|---|---|---|
| 3,506,330 A | 4/1970 | Allen | |
| 3,990,155 A | 11/1976 | Akin, Jr. et al. | |
| 4,247,161 A | 1/1981 | Unertl, Jr. | |
| 4,255,013 A * | 3/1981 | Allen | F41G 1/38 356/247 |
| 4,373,269 A | 2/1983 | Doliber et al. | |
| 4,408,842 A | 10/1983 | Gibson | |
| 4,998,811 A * | 3/1991 | Basta | F41G 1/38 359/422 |
| 5,513,440 A | 5/1996 | Murg | |
| 6,598,332 B1 * | 7/2003 | Jibiki | F41G 1/38 42/119 |
| 6,643,970 B2 | 11/2003 | Huber | |
| 6,762,884 B2 | 7/2004 | Beystrum et al. | |
| 6,772,550 B1 | 8/2004 | Leatherwood | |

(Continued)

FOREIGN PATENT DOCUMENTS

EP 0315853 A1 5/1989

OTHER PUBLICATIONS

Extended European Search Report for Application No. EP15151408.0 dated Jul. 28, 2015 (7 pages).

(Continued)

*Primary Examiner* — Benjamin P Lee
(74) *Attorney, Agent, or Firm* — Harness, Dickey & Pierce, P.L.C.

(57) ABSTRACT

An optical sight is provided and includes a housing having a first bearing surface integrally formed therewith and a relay assembly having at least one optical element, a main tube, and a track tube having at least one track. The track tube is selectively rotatable relative to and about the main tube to adjust an axial position of the at least one optical element within the main tube along an axis that is substantially parallel to a longitudinal axis of the main tube. The main tube includes a spherical surface that is in contact with the first bearing surface of the housing to define a pivot point of the main tube within the housing.

19 Claims, 6 Drawing Sheets

(56) References Cited

U.S. PATENT DOCUMENTS

| | | | |
|---|---|---|---|
| 6,816,305 B2 * | 11/2004 | Regan | F41G 1/38 359/399 |
| 7,415,791 B2 | 8/2008 | Williams, III et al. | |
| 7,483,213 B2 | 1/2009 | Pochapsky | |
| 7,612,952 B2 | 11/2009 | Schafer | |
| 7,684,115 B2 * | 3/2010 | Kammans | G02B 23/145 359/399 |
| 7,913,440 B2 | 3/2011 | Murg et al. | |
| 8,006,429 B2 | 8/2011 | Windauer | |
| 8,166,696 B2 | 5/2012 | Hamilton | |
| 8,312,667 B2 | 11/2012 | Thomas et al. | |
| 8,397,420 B2 | 3/2013 | Hamilton | |
| 8,468,930 B1 * | 6/2013 | Bell | F41G 11/001 342/67 |
| 2003/0140545 A1 | 7/2003 | Huber | |
| 2004/0080819 A1 * | 4/2004 | Regan | F41G 1/38 359/429 |
| 2007/0240356 A1 | 10/2007 | Klepp et al. | |
| 2008/0236018 A1 | 10/2008 | Halverson | |
| 2009/0044660 A1 | 2/2009 | Bonis | |
| 2009/0199452 A1 | 8/2009 | Huber | |
| 2009/0205461 A1 | 8/2009 | Windauer | |
| 2010/0175298 A1 | 7/2010 | Thomas et al. | |
| 2011/0061285 A1 | 3/2011 | Hamilton | |
| 2011/0102918 A1 | 5/2011 | Windauer | |
| 2011/0242650 A1 | 10/2011 | Windauer | |
| 2011/0261449 A1 | 10/2011 | Schmitt | |
| 2012/0198749 A1 * | 8/2012 | Hasselbach | G02B 7/10 42/124 |
| 2014/0115942 A1 | 5/2014 | Plaster | |

OTHER PUBLICATIONS

Ex Parte Quayle Office Action in U.S. Appl. No. 13/331,617, mailed Mar. 27, 2013.

U.S. Appl. No. 14/096,651, filed Dec. 4, 2013.

* cited by examiner

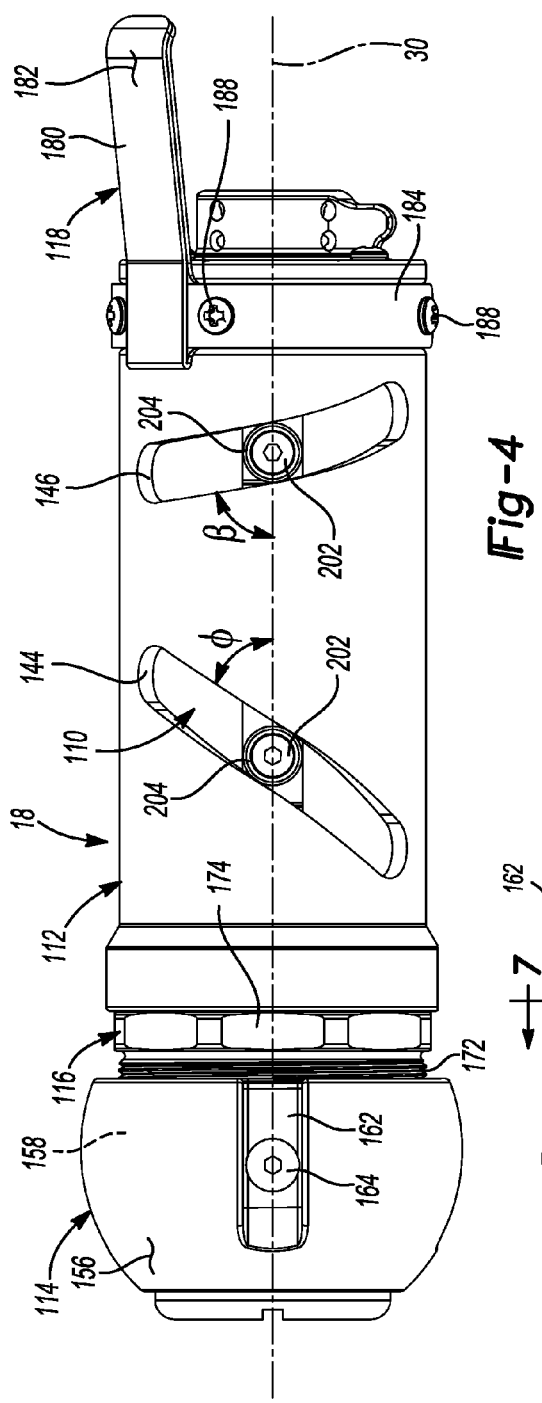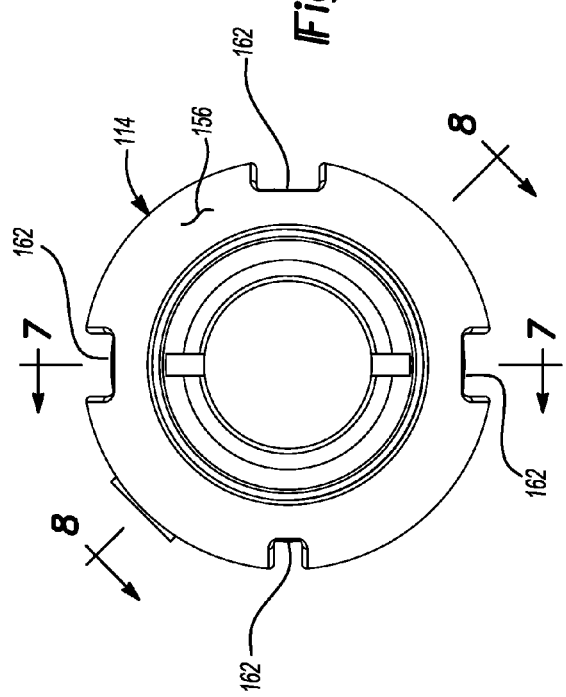

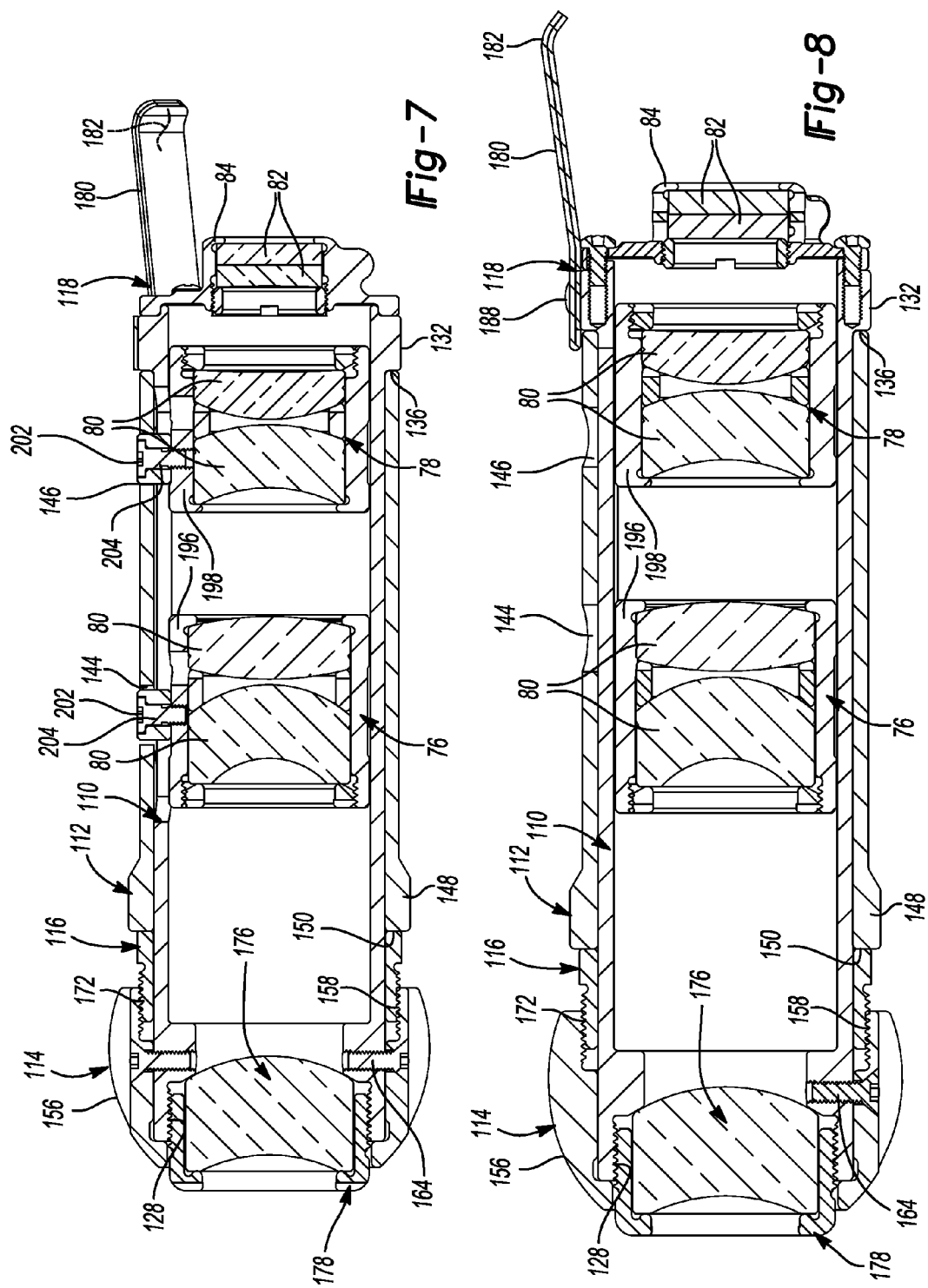

RELAY ASSEMBLY FOR OPTICAL SIGHT

FIELD

The present disclosure relates to an optical sight and more particularly to a relay tube for an optical sight.

BACKGROUND

This section provides background information related to the present disclosure which is not necessarily prior art.

Optical sights are commonly used with firearms such as rifles and/or handguns to allow a user to more clearly see a target and aim the firearm at the target. Conventional optical sights include a series of lenses and/or other optical components that magnify an image and provide a reticle to allow a user to align a magnified target relative to a barrel of the firearm. Optical sights may include one or more adjustment mechanisms that allow for adjustment of a position of the reticle relative to the barrel of the firearm to properly "zero" the optical sight to the firearm and/or to account for environmental conditions such as wind and elevation.

Optical sights may additionally include a relay assembly that allows a user to easily and reliably adjust a magnification of the optical sight. Such relay assemblies include a main tube supporting one or more optical elements (i.e., lenses) and a so-called "track tube" having one or more tracks or slots that slidably receive a bearing fixed for movement with at least one of the optical elements.

In operation, when a rotational force is applied to an adjustment collar of the optical sight, the force is transmitted to the track tube, thereby causing the track tube to rotate relative to the main tube. Such movement of the track tube relative to the main tube causes the bearing to move within and be guided by the track of the track tube. Movement of the bearings within the track results in axial movement of the bearing and associated optical element(s) in a direction substantially parallel to a longitudinal axis of the main tube, as the track is formed at an angle relative to the longitudinal axis. As a result, the magnification of the optical sight is either increased or decreased depending on the direction of rotation of the adjustment collar relative to a housing of the optical sight.

The relay assembly is also used to adjust a position of the reticle when zeroing the optical sight or when adjusting a position of the reticle to account for environmental conditions, as the relay assembly typically includes an optical element that has the reticle inscribed thereon. The optical element is carried by the main tube and may be moved along with the main tube relative to the housing of the optical sight by pivoting the main tube about a pivot point. Such movement of the main tube and reticle relative to the housing is accomplished by applying a rotational force to a dial of the adjustment mechanisms which, in turn, causes translation of a post that contacts and causes pivotal movement of the main tube relative to the housing.

While conventional relay assemblies adequately allow for adjustment of a magnification of an optical sight and, further, adequately allow a user to adjust a position of a reticle to account for windage and elevation, such sights are typically difficult to manufacture and often require numerous components to allow the optical sight to have the desired functionality.

SUMMARY

This section provides a general summary of the disclosure, and is not a comprehensive disclosure of its full scope or all of its features.

An optical sight is provided and includes a housing having a first bearing surface integrally formed therewith and a relay assembly having at least one optical element, a main tube, and a track tube having at least one track. The track tube is selectively rotatable relative to and about the main tube to adjust an axial position of the at least one optical element within the main tube along an axis that is substantially parallel to a longitudinal axis of the main tube. The main tube includes a spherical surface that is in contact with the first bearing surface of the housing to define a pivot point of the main tube within the housing.

In another configuration, an optical sight is provided and includes a sight housing having a first bearing surface integrally formed therewith and a relay assembly having at least one optical element and a relay housing including a main tube and a track tube having at least one track. The track tube is selectively rotatable relative to and about the main tube to adjust an axial position of the at least one optical element within the main tube along an axis that is substantially parallel to a longitudinal axis of the main tube. The relay housing includes a spherical surface that is in contact with the first bearing surface of the sight housing to define a pivot point of the relay housing within the sight housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a side view of a relay tube assembly of the optical sight of FIG. 1;

FIG. 6 is an end view of the relay tube assembly of FIG. 4 showing a spherical end cap;

FIG. 7 is a cross-sectional view of the relay tube assembly taken along line 7-7 of FIG. 6; and FIG. 8 is a cross-sectional view of the relay tube assembly taken along line 8-8 of FIG. 6.

Corresponding reference numerals indicate corresponding parts throughout the several views of the drawings.

DETAILED DESCRIPTION

Figure 1:
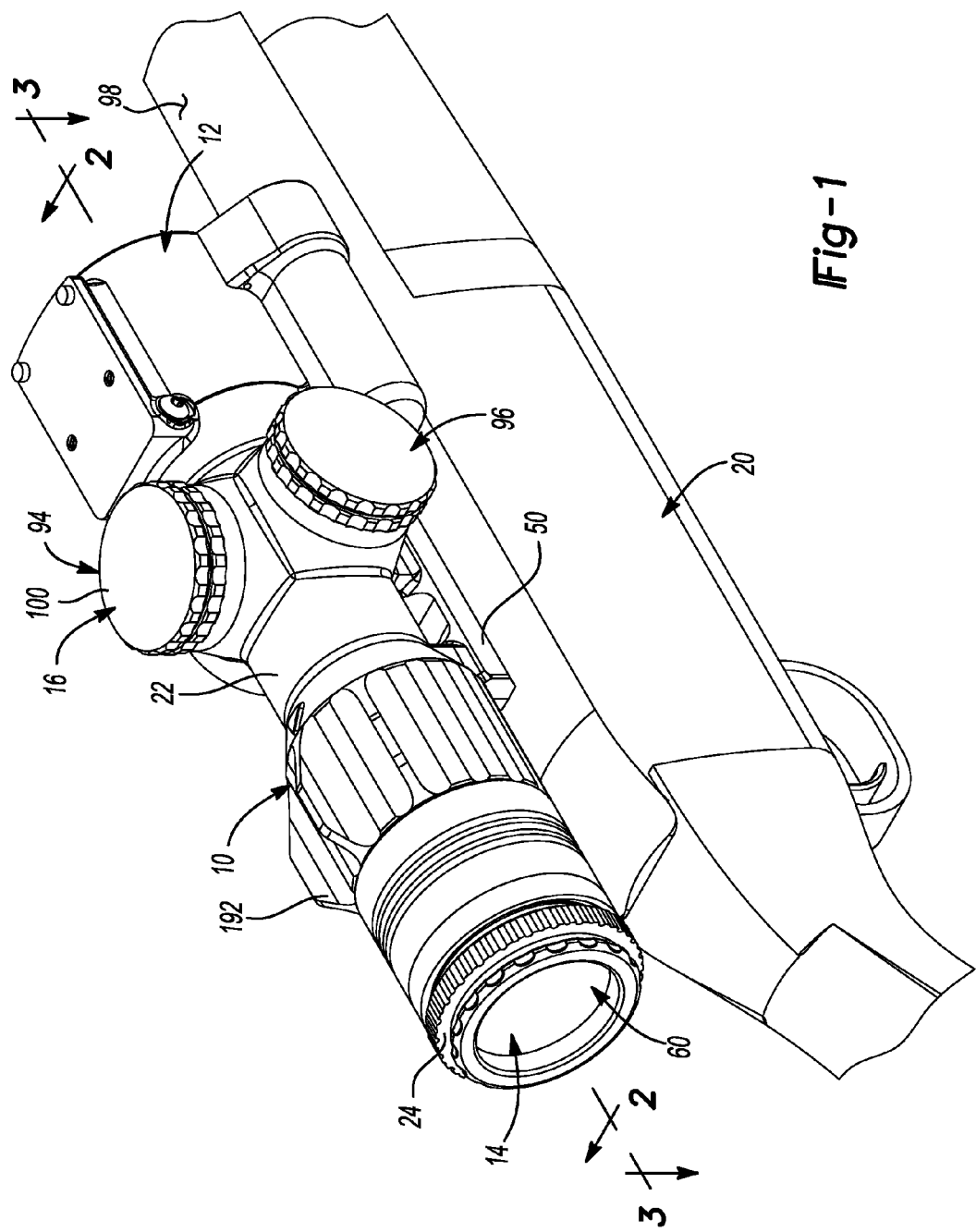
FIG. 1 is a perspective view of a firearm incorporating an optical sight in accordance with the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
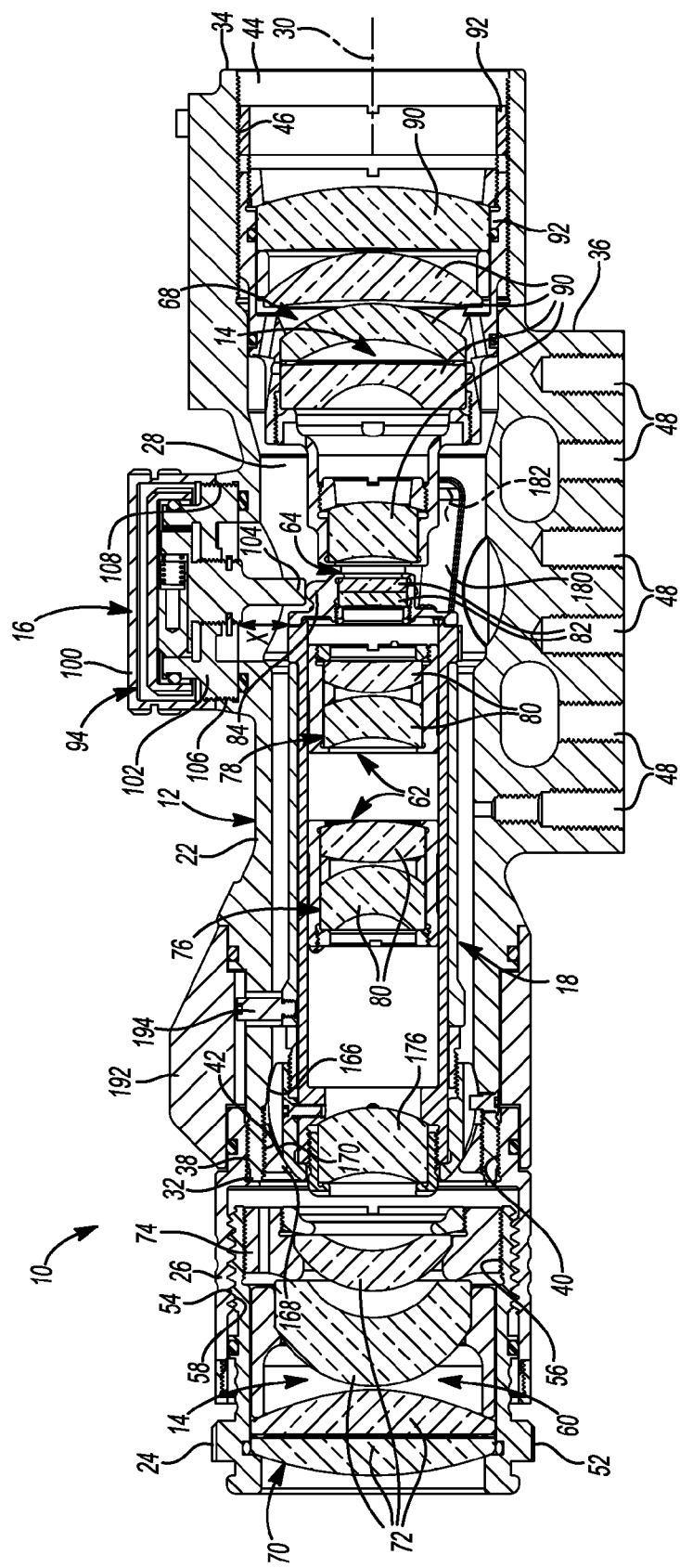
FIG. 2 is a cross-sectional view of the optical sight of FIG. 1 taken along line 2-2 of FIG. 1.
Figure 3:
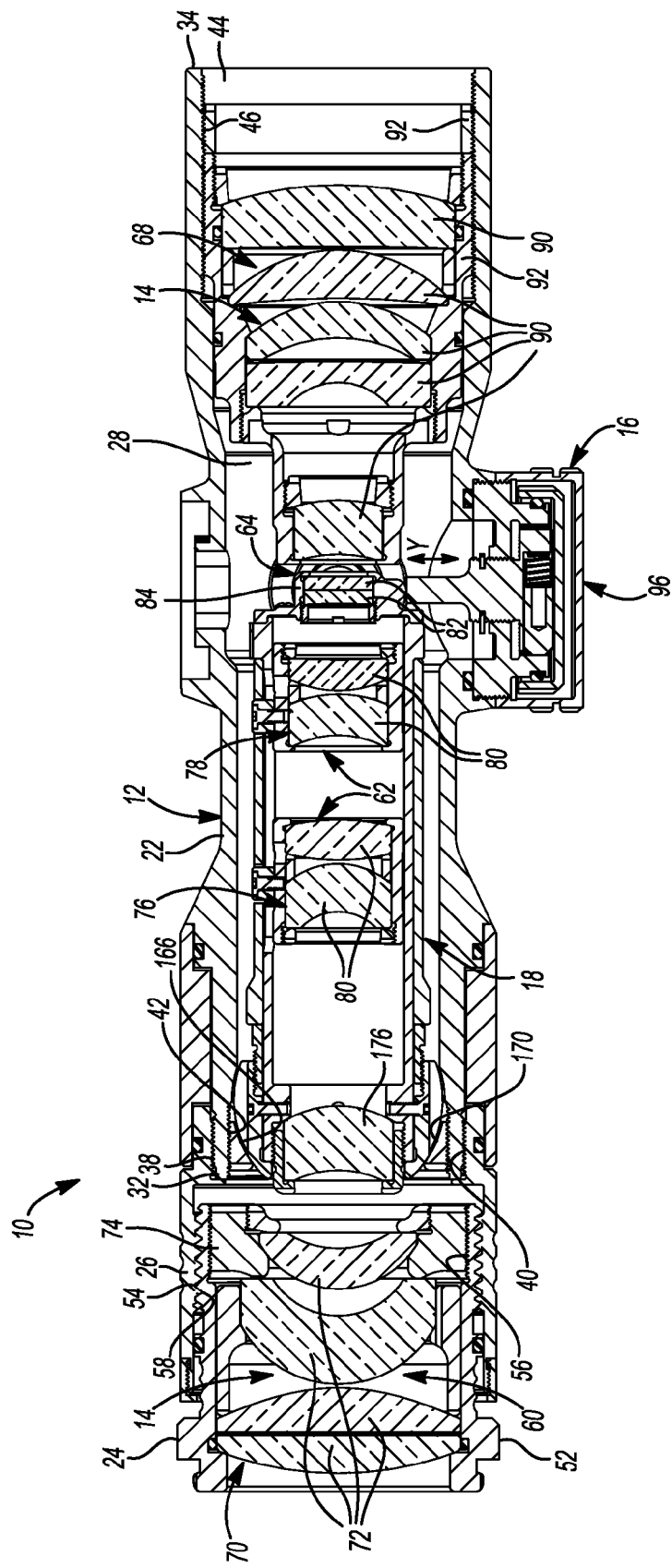
FIG. 3 is a cross-sectional view of the optical sight of FIG. 1 taken along line 3-3 of FIG. 1.

With reference to FIGS. 1-3, an optical sight 10 is provided and may include a housing 12, an optics train 14, an adjustment system 16, and a relay assembly 18. The housing 12 is removably attached to a firearm 20 and supports the optics train 14 and the adjustment system 16. The optics train 14 cooperates with the housing 12 to provide a magnified image of a target while the adjustment system 16 positions at least a portion of the optics train 14 and the relay assembly 18 relative to the housing 12 to properly align a reticle pattern (not shown) associated with the optics train 14 and the relay assembly 18 relative to the firearm 20. A light-emitting diode (LED; not shown) or other illumination system may cooperate with the optics train 14 to illuminate the reticle pattern to assist a user in aligning the target relative to the optical sight 10 and the firearm 20.

The housing 12 may be removably secured to the firearm 20 and includes a main body 22, an eyepiece 24, and an attachment collar 26 that secures the eyepiece 24 to the main body 22. The main body 22 may be a generally tubular member and includes an inner cavity 28, a longitudinal axis 30 extending between a first end 32 and a second end 34 of the housing 12, and a mounting portion 36 for attaching the housing 12—via the main body 22—to the firearm 20.

As shown in FIG. 2, the first end 32 includes a series of threads 38 that cooperate with threads 40 of the attachment collar 26 to secure the attachment collar 26 to the main body 22 at the first end 32. The first end 32 additionally includes a series of threads formed on an opposite side of the main body 22 at the first end 32 than the threads 38 such that the threads 42 oppose the inner cavity 28 of the main body 22. The second end 34 is disposed on an opposite end of the main body 22 than the first end 32 and includes an opening 44 having a series of internal threads 46. The internal threads 46 cooperate with a portion of the optics train 14 to retain the optics train 14 within the main body 22.

The mounting portion 36 is disposed along the longitudinal axis 30 and is located generally between the first end 32 and the second end 34. The mounting portion 36 may include a series of threaded bores 48 (FIG. 2) that cooperate with a mounting feature 50 (FIG. 1) associated with the firearm 20 to allow the optical sight 10 to be mounted to the firearm 20 at the mounting portion 36 of the housing 12.

The eyepiece 24 is attached to the main body 22 at the first end 32 via the attachment collar 26, as described above. The eyepiece 24 includes a housing 52 having a series of external threads 54 and a series of internal threads 56. The external threads 54 engage internal threads 58 of the attachment collar 26 to permit adjustment of the eyepiece 24 relative to the main body 22.

The eyepiece 24 is positioned relative to the first end 32 of the main body 22 by the attachment collar 26 to allow the eyepiece 24 to support a portion of the optics train 14 relative to the main body 22 at a predetermined distance. Namely, and as shown in FIGS. 2 and 3, a portion of the optics train 14 is positioned a predetermined distance along the longitudinal axis 30 from the relay assembly 18 by the attachment collar 26.

With particular reference to FIGS. 2 and 3, the optics train 14 is shown as including an ocular assembly 60, a zoom assembly 62, a reticle assembly 64, and an objective assembly 68. The ocular assembly 60 may include an ocular-lens assembly 70 having a series of lenses 72. The ocular-lens assembly 70 may be supported by the eyepiece 24 relative to the main body 22 of the housing 12 by one or more retention collars 74. In one configuration, the retention collars 74 threadably engage the internal threads 56 of the eyepiece 24 to retain and position the lenses 72 of the ocular-lens assembly 70 within the eyepiece 24.

The zoom assembly 62 is supported within the housing 12 of the optical sight 10 by the relay assembly 18 and may include a first relay lens assembly 76 and a second relay lens assembly 78. The first relay lens assembly 76 and the second relay lens assembly 78 may each include a series of lenses 80 that cooperate with one another to adjust a magnification of an image received by the housing 12 at the opening 44.

The reticle assembly 64 may include one or more reticle lenses 82 supported by a reticle-lens housing 84. The reticle-lens housing 84 is attached to and is supported by the relay assembly 18 within the inner cavity 28 of the main body 22. Accordingly, when the relay assembly 18 is moved relative to and within the inner cavity 28 of the housing 12, the lenses 82 are likewise moved relative to and within the inner cavity 28. Because one of the lenses 82 includes the reticle pattern inscribed thereon, movement of the reticle-lens housing 84 and the lenses 82 relative to and within the inner cavity 28 of the housing 12 likewise adjusts a position of the reticle pattern relative to and within the housing 12. Further, because the housing 12 is fixed to the firearm 20 via the mounting portion 36 of the main body 22 and via the mounting feature 50 of the firearm 20, adjustment of the reticle pattern relative to the housing 12 likewise adjusts a position of the reticle pattern relative to the firearm 20.

The objective assembly 68 may be disposed proximate to the second end 34 of the housing 12 and may include a series of objective lenses 90. The objective lenses 90 may be retained and supported within the housing 12 via at least one retention collar 92. In one configuration, the retention collar(s) 92 threadably engages the internal threads 46 of the opening 44 to position and retain the objective lenses 90 at a desired location along the longitudinal axis 30 of the housing 12.

The above description of the optics train 14 is provided to illustrate an exemplary configuration of optical components. The principles of the present disclosure are not limited in application to an optical sight having an optics train including the particular components and/or arrangement of components described above. The optical sight 10 may include any other configuration or arrangement of optical components to suit a given application and may provide the optical sight 10 with virtually any magnification.

With continued reference to FIGS. 2 and 3, the adjustment system 16 is shown to include first and second adjuster assemblies or turrets 94, 96. In one configuration, the adjustment turret 94 is positioned relative to and is supported by the housing 12 to allow the adjustment turret 94 to adjust a position of the reticle-lens housing 84 and, thus, the lenses 82, in a direction substantially perpendicular to the longitudinal axis 30 and in a direction (X), as shown in FIG. 2. Movement of the lenses 82 in the direction (X) likewise causes movement of the reticle pattern in the direction (X) which, in turn, adjusts a position of the reticle pattern relative to the firearm 20. Adjusting a position of the reticle pattern in the direction (X) adjusts a position of the reticle pattern in a direction toward or away from a top surface 98 of the firearm 20 and therefore adjusts the elevational position of the reticle pattern and allows a user to account for elevation when shooting at targets of different distances.

The adjustment turret 96 is positioned substantially perpendicular to the longitudinal axis 30 but is rotated about the longitudinal axis 30 ninety degrees (90°) relative to the adjustment turret 94. The adjustment turret 96 may likewise adjust a position of the reticle-lens housing 84 and associated lenses 82 relative to the housing 12 in a similar fashion as the adjustment turret 94. However, the adjustment turret 96 adjusts a position of the lenses 82 in a direction (Y; FIG. 3), which, in turn, moves the lenses 82 in a direction substantially ninety degrees (90°) relative to direction (X). Movement of the lenses 82 in the direction (Y) causes the reticle pattern to likewise move in the direction (Y) and substantially parallel to the top surface 98 of the firearm 20. Accordingly, the adjustment turret 96 allows a user to account for windage when using the optical sight 10 and firearm 20.

The adjustment turrets 94, 96 are substantially identical. Accordingly, only a description of the adjustment turret 94 is provided.

The adjustment turret 94 includes a cover 100, a main body 102, and an adjustment screw 104. The cover 100 is secured to the adjuster screw 104. Accordingly, when the cover 100 is rotated relative to the main body 22, the adjustment screw 104 likewise moves relative to the main body 22. Depending on the direction of rotation of the cover 100 relative to the main body 102, the adjustment screw 104 either moves along a direction (X) toward the reticle-lens housing 84 or away from the reticle-lens housing 84. The main body 102 rotatably supports the cover 100 relative to the housing 12 and also supports the adjustment screw 104 for movement in the direction (X) relative to the housing 12.

The main body 102 includes a series of threads 106 that matingly engage a threaded bore 108 of the main body 22. Engagement between the threads 106 of the main body 102 and the threaded bore 108 of the housing 12 attaches the main body 102 to the housing 12. Further, positioning the main body 102 relative to the main body 22 allows the adjustment screw 104 to extend into the inner cavity 28 of the housing 12, thereby allowing the adjustment screw 104 to contact the reticle-lens housing 84. As will be described in greater detail below, the reticle-lens housing 84 is biased into engagement with the adjustment screw 104 by the relay assembly 18.

With particular reference to FIGS. 4-8, the relay assembly 18 is shown and includes a main tube 110, a track tube 112, an end cap 114, a track tube retainer 116, and a biasing element 118. The main tube 110 slidably supports the first relay lens assembly 76 and the second relay lens assembly 78 therein for movement in a direction substantially parallel to the longitudinal axis 30, as shown in FIGS. 2 and 3. The main tube 110 additionally rotatably supports the track tube 112 within the inner cavity 28 and allows the track tube 112 to be rotated about the longitudinal axis 30 and relative to the main tube 110.

The main tube 110 includes a first end 120, a second end 122, an inner cavity 124 extending between the first end 120 and the second end 122, and a slot 126. The first end 120 includes a series of inner threads 128 and an engagement surface 130. The second end 122 is disposed at an opposite end of the main tube 110 than the first end 120 and includes a collar 132 that extends from an outer surface 134 of the main tube 110. The collar 132 defines an engagement surface 136 at a junction of the collar 132 and the outer surface 134. The slot 126 is formed through the main tube 110 such that the slot 126 extends from the outer surface 134 and into the inner cavity 124. The slot 126 extends generally between the first end 120 and the second end 122 and is substantially parallel to the longitudinal axis 30.

The track tube 112 is slidably and rotatably received by the main tube 110 such that an inner surface 138 of the track tube 112 opposes the outer surface 134 of the main tube 110 when the track tube 112 is installed on the main tube 110. The track tube 112 includes a first end 140, a second end 142, a first slot 144, and a second slot 146. The first end 140 includes a collar 148 having an engagement surface 150 and a threaded bore 152. The second end 142 is disposed on an opposite end of the track tube 112 than the first end 140 and opposes the engagement surface 136 of the main tube 110 when the track tube 112 is installed on the main tube 110.

The first slot 144 and the second slot 146 are each formed at an angle relative to the longitudinal axis 30. For example, and as shown in FIG. 4, the first slot 144 may be formed at an angle (ϕ) while the second slot 146 is formed at an angle (β). Each of the angles (ϕ, β) are acute angles such that the slots are angled toward one another, as best shown in FIG. 4. The angles (ϕ, β) may be different acute angles to allow for different degrees of adjustment of the relay lens assemblies 76, 78, as will be described in greater detail below. The slots 144, 146 extend through the track tube 112 between the inner surface 138 and an outer surface 154.

Figure 5:
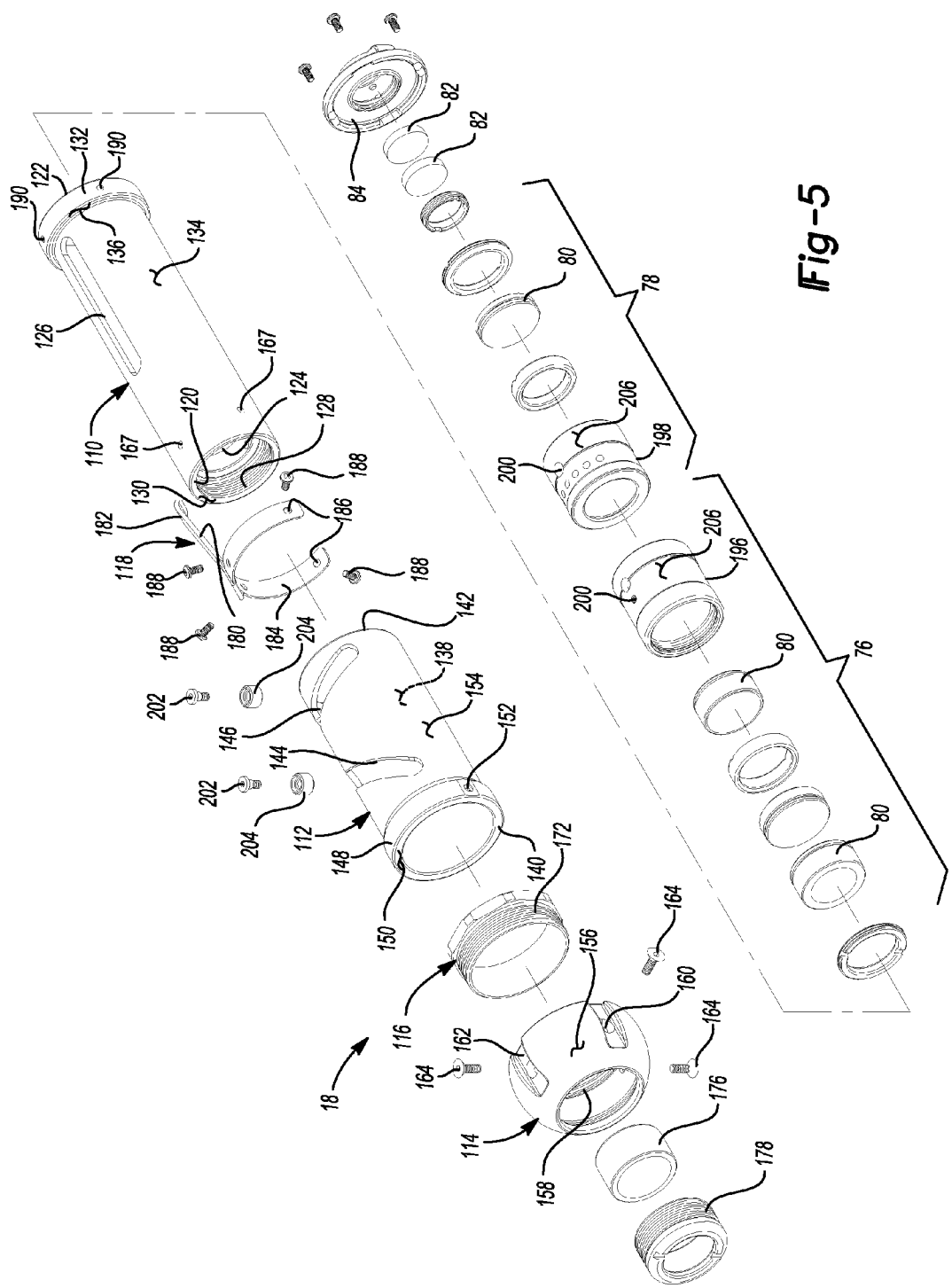
FIG. 5 is an exploded view of the relay tube assembly of FIG. 4.

The end cap 114 includes a spherical outer surface 156, internal threads 158 formed on an opposite side of the end cap 114 than the spherical outer surface 156, bores 160 extending through the end cap 114, and a series of channels 162. As shown in FIG. 5, the bores 160 are located at spaced intervals around the end cap 114 and are formed within the channels 162. The bores 160 receive fasteners 164 to attach the end cap 114 to the main tube 110 at respective attachment apertures 166 of the main tube 110.

The end cap 114 is in engagement with a socket or seat 166 that is integrally formed in the main body 22 of the housing 12. The socket or seat 166 may be machined into the housing 12 and is disposed within the inner cavity 28. The spherical outer surface 156 of the end cap 114 is in engagement with the socket 166 of the housing 12 when the relay assembly 18 is installed in the inner cavity 28. The end cap 114 is retained within the inner cavity 28 and is maintained in contact with the socket 166 by a retainer 168 (FIG. 2). The retainer 168 is matingly received by the threads 42 of the housing 12 at the first end 32 and includes an arcuate inner surface or socket 170. The socket 170 of the retainer 168 cooperates with the socket 166 of the housing 12 to provide a bearing surface for the end cap 114.

When the end cap 114 is in contact with the socket 166 of the housing 12 and with the socket 170 of the retainer 168, the end cap 114 is permitted to rotate about and within the housing 12 about the sockets 166, 170. Rotation of the end cap 114 relative to and within the housing 12 likewise causes the main tube 110 and, thus, the track tube 112, to pivot about the end cap 114 relative to and within the inner cavity 28 of the housing 12. The main tube 110 and the track tube 112 pivot with the end cap 114, as the end cap 114 is fixed for movement with the main tube 110 via the fasteners 164 and the track tube 112 is attached to the main tube 110 and extends generally between the end cap 114 and the engagement surface 136 of the collar 132. Therefore, when a force is applied proximate to the second end 122 of the main tube 110, the main tube 110 and the track tube 112 move relative to the housing 12 and pivot about the end cap 114 as the spherical outer surface 156 of the end cap 114 is directed by and is in contact with the sockets 166, 170.

The retainer 168 may be threaded into the first end 32 of the main body 22 until the socket 170 engages the spherical outer surface 156 of the end cap 114. Namely, the retainer 168 may be inserted into the first end 32 until a desired force is exerted on the end cap 114 at the spherical outer surface 156 to provide a desired degree of resistance to movement of the spherical outer surface 156 relative to and within the sockets 166, 170. Once the desired position of the retainer 168 relative to the socket 166 of the housing 12 is achieved and the end cap 114 is positioned between the sockets 166, 170, Loctite® or another suitable adhesive may be used to fix a position of the retainer 168 relative to the housing 12.

As described, the spherical outer surface 156 of the end cap 114 is in direct contact with an inner surface of the housing 12. Namely, the spherical outer surface 156 is in direct contact with the socket 166 formed and/or machined into the housing 12. Forming the socket 166 integrally with the housing 12 and/or machining the socket 166 into the housing 12 obviates the need for a separate retainer to support the end cap 114 for pivotable movement relative to and within the inner cavity 28 of the housing 12.

The position of the track tube 112 along the main tube 110 along the longitudinal axis 30 is controlled by the track tube retainer 116. Namely, the threads 172 of the track tube retainer 116 engage the internal threads 158 of the end cap 114. Accordingly, when a rotational force is applied to the track tube retainer 116 at a series of flats 174, the track tube retainer 116 rotates relative to the end cap 114 and, depending on the direction of rotation applied to the flats 174, moves along the longitudinal axis 30 in a direction either toward the second end 122 of the main tube 110 or away from the second end 122 of the main tube 110. During assembly, the track tube 112 is first installed on the main tube 110 such that the inner surface 138 of the track tube 112 opposes the outer surface 134 of the main tube 110. The track tube 112 may be moved along the longitudinal axis 30 until the second end 142 of the track tube 112 contacts the engagement surface 136 of the main tube 110. At this point, the track tube retainer 116 may be threaded onto the end cap 114 and the subassembly of the end cap 114 and the track tube retainer 116 may be positioned onto the main tube 110 at the first end 120.

Once the end cap 114 and track tube retainer 116 are positioned over the first end 120 of the main tube 110, a rotational force may be applied to the end cap 114 to properly align the bores 160 of the end cap 114 with the attachment apertures 167 of the main tube 110. At this point, the fasteners 164 may be inserted into the bores 160 and may subsequently be inserted into the attachment apertures 167 of the main tube 110 to fix the end cap 114 for movement with the main tube 110. Fixing the end cap 114 for movement with the main tube 110 likewise positions the track tube retainer 116 between the end cap 114 and the first end 140 of the track tube 112.

A rotational force may be applied to the track tube retainer 116 at the flats 174 to cause the track tube retainer 116 to move in a direction toward the track tube 112. The rotational force may be applied to the track tube retainer 116 until the track tube retainer 116 contacts the track tube 112 at the engagement surface 150. While the track tube retainer 116 is described as contacting the engagement surface 150 of the track tube 112, a shim (not shown) having a desired thickness could alternatively be used during assembly of the optical sight 10. Namely, the shim may be positioned between the track tube retainer 116 and the engagement surface 150 of the track tube 112 to set a desired distance between the track tube retainer 116 and the track tube 112. Once the track tube retainer 116 contacts the shim and urges the shim into engagement with the engagement surface 150, the shim may be removed and a position of the track tube retainer 116 relative to the end cap 114 may be fixed. For example, Loctite® or another suitable adhesive may be used to prevent additional rotation of the track tube retainer 116 relative to and within the end cap 114, thereby fixing a position of the track tube retainer 116 relative to the end cap 114. Fixing a position of the track tube retainer 116 relative to the end cap 114 likewise fixes a position of the track tube retainer 116 relative to the track tube 112 and, thus, fixes an axial distance between the track tube retainer 116 and the engagement surface 136 of the main tube 110.

The axial distance between the track tube retainer 116 and the engagement surface 136 of the main tube 110 determines an amount of axial travel of the track tube 112 along the longitudinal axis 30 once the track tube retainer 116 is installed and is fixed for movement with the end cap 114. Accordingly, the track tube retainer 116 cooperates with the collar 132 of the main tube 110 to define a degree of axial movement of the track tube 112 in a direction substantially parallel to the longitudinal axis 30.

Allowing the track tube retainer 116 to move along the longitudinal axis 30 into a desired position relative to the track tube 112 allows the track tube retainer 116 to account for any manufacturing tolerances amongst the various components 110, 112, 114, 116 of the relay assembly 18. Namely, because the track tube retainer 116 is threadably attached to the end cap 114, an axial position of the track tube retainer 116 along the longitudinal axis 30 may be adjusted during manufacturing of the optical sight 10 such that the distance between the track tube retainer 116 and the collar 132 of the main tube 110 may be substantially constant, regardless of any manufacturing tolerances of the various components 110, 112, 114, 116. For example, if a length of the track tube 112 extending between the first end 140 and the second end 142 varies between different parts of different optical sights 10, allowing the track tube retainer 116 to be adjustable relative to the end cap 114 before the track tube retainer 116 is fixed relative to the end cap 114 allows the track tube retainer 116 to set a desired axial travel of the track tube 112 between track tube retainer 116 and the end cap 114 of the main tube 110, regardless of the variance in lengths amongst the track tube 112. In short, the track tube retainer 116 allows for a repeatable distance between track tube retainer 116 and the end cap 114 which, in turn, allows for a repeatable axial travel of the track tube 112 relative to the main tube 110, regardless of any manufacturing tolerances of the various components 110, 112, 114, 116.

The end cap 114 may additionally include a lens 176 that is supported within the end cap 114 by a retainer 178. The lens 176 may cooperate with the first relay lens assembly 76 and the second relay lens assembly 78 to provide a desired magnification of a target. Accordingly, the lens 176 is part of the optics train 14 and is fixed for movement with the end cap 114.

The biasing element 118 may include a projection 180 having an engagement surface 182. The projection 180 may extend from a pair of arms 184 that attach the projection 180 to the main tube 110. Specifically, the arms 184 may encircle a portion of the collar 132 and may each include at least one attachment aperture 186 that receives a respective fastener 188. The fasteners 188 are inserted into the attachment apertures 186 of the arms 184 and are subsequently inserted into respective attachment apertures 190 formed in the collar 132. The attachment apertures 190 may include a series of threads (not shown) that threadably receive the fasteners 188.

Once the biasing element 118 is attached to the collar 132, the biasing element 118 is fixed for movement with the main tube 110. The projection 180 extends away from the main tube 110 to allow the engagement surface 182 to contact an inner surface of the housing 12 within the inner cavity 28. The engagement surface 182 contacts the inner surface of the housing 12 at a location substantially between the adjustment turrets 94, 96 to allow the biasing element 118 to simultaneously exert a force on both of the adjustment turrets 94, 96.

In one configuration, the projection 180 of the biasing element 118 extends between the adjustment turrets 94, 96 such that the projection 180 is at a substantially forty-five degree (45°) angle relative to each of the adjustment turrets 94, 96. In other words, the projection 180 is offset from the adjustment turret 94 and from the adjustment turret 96 by approximately forty-five degrees (45°). Positioning the projection 180 in the foregoing manner allows the biasing element 118 to simultaneously exert a force on the adjustment turrets 94, 96 which, in turn, allows the lenses 82 of the reticle-lens housing 84 to move in a direction away from the mounting portion 36 along direction (X) when the adjustment turret 94 causes the adjustment screw 104 to move along direction (X) and away from the mounting portion 36. Conversely, when the adjustment turret 94 causes the adjustment screw 104 to move in the direction (X) and toward the mounting portion 36, the projection 180 deflects and provides resistance to such motion to allow a user to obtain an accurate adjustment of the lenses 82 and, thus, an accurate adjustment of the reticle pattern.

Once the relay assembly 18 is installed in the housing 12 and the eyepiece 24 is attached to the first end 32, the optical sight 10 may be attached to the firearm 20 at the mounting feature 50. At this point, a user may use one or both of the adjustment turrets 94, 96 to account for elevation and windage by selectively causing the respective plungers 104 to move further into or to further retract from the inner cavity 28, thereby adjusting a position of the reticle-lens housing 84 relative to and within the inner cavity 28 of the housing 12. As described above, such movement of the reticle-lens housing 84 relative to and within the inner cavity 28 likewise causes movement of the lenses 82 and, thus, adjusts a position of the reticle pattern relative to not only the housing 12 but also the firearm 20.

Movement of the reticle-lens housing 84 is permitted by applying a force on the reticle-lens housing 84 by the adjustment screw 104 which, in turn, causes the relay assembly 18 to pivot about the end cap 114. Such movement of the end cap 114 causes the spherical outer surface 156 to engage the sockets 166, 170. Such engagement between the spherical outer surface 156 and the sockets 166, 170 controls movement of the relay assembly 18 relative to and within the inner cavity 28.

An increase or decrease in magnification may be accomplished by applying a rotational force to an adjustment collar 192 rotatably supported by the housing 12 and by the attachment collar 26 (FIG. 2). The adjustment collar 192 includes a post 194 that is fixed for movement with the adjustment collar 192 and is threadably received by the threaded bore 152 of the track tube 112. Accordingly, when a rotational force is applied to the adjustment collar 192 and the adjustment collar 192 is moved relative to the housing 12, the force is transmitted to the track tube 112 by the post 194. The transmitted force likewise causes the track tube 112 to rotate relative to the housing 12 about the longitudinal axis 30.

Rotation of the track tube 112 about the longitudinal axis 30 adjusts a magnification of the optical sight 10 by causing the first relay lens assembly 76 and the second relay lens assembly 78 to move along the longitudinal axis 30. Namely, the first relay lens assembly 76 and the second relay lens assembly 78 each include a respective housing 196, 198, each having a threaded bore 200. The bores 200 receive a fastener 202 having a bearing 204. Accordingly, when the fasteners 202 are installed in the bores 200, the bearings 204 are disposed generally between a head of the fasteners 202 and an outer surface 206 of the respective housings 196, 198.

The bearings 204 are rotatably received within the respective slots 144, 146 of the track tube 112 and are likewise received within the slot 126 of the main tube 110. The bearings 204 rotate about the respective fasteners 202 to allow the bearings 204 to move relative to and within the slots 144, 146 of the track tube 112 and within the slot 126 of the main tube 110.

When a rotational force is applied to the adjustment collar 192 and the rotational force is applied to the track tube 112 via the post 194, the force is likewise transmitted to the bearings 204 due to the angled nature of the first slot 144 and the second slot 146. Namely, as the track tube 112 rotates relative to and about the main tube 110, the bearings 204 traverse the first slot 144 and the second slot 146. Such movement likewise causes the bearings 204 to move in a direction substantially parallel to the longitudinal axis 30 and within the slot 126 of the main tube 110.

Movement of the bearings 204 along the slot 126 of the main tube 110 likewise causes movement of the housings 196, 198 in a direction substantially parallel to the longitudinal axis 30 and within the inner cavity 124 of the main tube 110. Such movement of the housings 196, 198 in a direction substantially parallel to the longitudinal axis 30 and within the main tube 110 likewise causes movement of the respective lenses 80 associated with the housings 196, 198 to move within and relative to the main tube 110. Movement of the lenses 80 causes an adjustment to the magnification of the optical sight 10. Once a desired magnification is achieved, the force applied to the adjustment collar 192 may be released and a position of the first relay lens assembly 76 and the second relay lens assembly 78 and, thus, the associated lenses 80 within the main tube 110, is maintained due to engagement between the bearings 204 within the respective slots 126, 144, 146 of the main tube 110 and the track tube 112.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optical sight comprising:
a housing having a first bearing surface integrally formed therewith;
a relay assembly having at least one optical element, a main tube, and a track tube having at least one track, said track tube selectively rotatable relative to and about said main tube to adjust an axial position of said at least one optical element within said main tube along an axis that is substantially parallel to a longitudinal axis of said main tube, said main tube including a spherical surface that is in contact with said first bearing surface of said housing to define a pivot point of said main tube within said housing; and
a biasing element attached to said main tube, wherein said biasing element includes a first end fixed for movement with said main tube and a second end in contact with an inner surface of said housing, said biasing element exerting a force on said main tube when said main tube is installed in said housing.

2. The optical sight of claim 1, further comprising a collar supported by said housing and including a second bearing surface, said second bearing surface cooperating with said first bearing surface of said housing and engaging said spherical surface of said main tube to define said pivot point.

3. The optical sight of claim 2, wherein said collar includes a series of threads formed on an opposite side of said collar than said second bearing surface, said series of threads operable to engage mating threads of said housing to attach said collar to said housing.

4. The optical sight of claim 1, further comprising an end cap providing said relay assembly with said spherical surface, said end cap attached to said main tube.

5. The optical sight of claim 4, further comprising a retainer disposed between said end cap and said track tube, said retainer operable to engage said track tube to restrict movement of said track tube in a direction substantially parallel to said longitudinal axis of said main tube.

6. The optical sight of claim 5, wherein said retainer includes a first retention element that cooperates with a second retention element of said end cap to attach said retainer to said end cap, said first retention element cooperating with said second retention element to permit said retainer to selectively move in a direction substantially parallel to said longitudinal axis of said main tube to allow said retainer to engage said track tube.

7. The optical sight of claim 6, wherein said first retention element and said second retention element are threads.

8. The optical sight of claim 5, wherein said retainer is threadably attached to said end cap.

9. An optical sight comprising:
a sight housing having a first bearing surface integrally formed therewith;
a relay assembly having at least one optical element and a relay housing including a main tube and a track tube having at least one track, said track tube selectively rotatable relative to and about said main tube to adjust an axial position of said at least one optical element within said main tube along an axis that is substantially parallel to a longitudinal axis of said main tube, said relay housing including a spherical surface that is in contact with said first bearing surface of said sight housing to define a pivot point of said relay housing within said sight housing; and
a biasing element attached to said relay housing, wherein said biasing element includes a first end fixed for movement with said main tube and a second end in contact with an inner surface of said sight housing, said biasing element exerting a force on said main tube when said main tube is installed in said sight housing.

10. The optical sight of claim 9, further comprising a collar supported by said sight housing and including a second bearing surface, said second bearing surface cooperating with said first bearing surface of said sight housing and engaging said spherical surface of said relay housing to define said pivot point.

11. The optical sight of claim 10, wherein said collar includes a series of threads formed on an opposite side of said collar than said second bearing surface, said series of threads operable to engage mating threads of said sight housing to attach said collar to said sight housing.

12. The optical sight of claim 9, further comprising an end cap providing said relay assembly with said spherical surface, said end cap attached to said main tube.

13. The optical sight of claim 12, further comprising a retainer disposed between said end cap and said track tube, said retainer operable to engage said track tube to restrict movement of said track tube in a direction substantially parallel to said longitudinal axis of said main tube.

14. The optical sight of claim 13, wherein said retainer includes a first retention element that cooperates with a second retention element of said end cap to attach said retainer to said end cap, said first retention element cooperating with said second retention element to permit said retainer to selectively move in a direction substantially parallel to said longitudinal axis of said main tube to allow said retainer to engage said track tube.

15. The optical sight of claim 14, wherein said first retention element and said second retention element are threads.

16. The optical sight of claim 13, wherein said retainer is threadably attached to said end cap.

17. An optical sight comprising:
  a housing having a first bearing surface integrally formed therewith;
  a relay assembly having at least one optical element, a main tube, and a track tube having at least one track, said track tube selectively rotatable relative to and about said main tube to adjust an axial position of said at least one optical element within said main tube along an axis that is substantially parallel to a longitudinal axis of said main tube, said main tube including a spherical surface that is in contact with said first bearing surface of said housing to define a pivot point of said main tube within said housing;
  an end cap providing said relay assembly with said spherical surface, said end cap attached to said main tube; and
  a retainer disposed between said end cap and said track tube, said retainer operable to engage said track tube to restrict movement of said track tube in a direction substantially parallel to said longitudinal axis of said main tube, wherein said retainer is threadably attached to said end cap.

18. The optical sight of claim 17, wherein said retainer includes a first retention element that cooperates with a second retention element of said end cap to attach said retainer to said end cap, said first retention element cooperating with said second retention element to permit said retainer to selectively move in a direction substantially parallel to said longitudinal axis of said main tube to allow said retainer to engage said track tube.

19. The optical sight of claim 18, wherein said first retention element and said second retention element are threads.

* * * * *